(12) United States Patent
Chard et al.

(10) Patent No.: US 7,934,113 B2
(45) Date of Patent: Apr. 26, 2011

(54) SELF-CLEARING ASYNCHRONOUS INTERRUPT EDGE DETECT LATCHING REGISTER

(75) Inventors: Gary Franklin Chard, Garland, TX (US); Yilun Wang, Plano, TX (US); T-Pinn Ronnie Koh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1009 days.

(21) Appl. No.: 11/751,551

(22) Filed: May 21, 2007

(65) Prior Publication Data

US 2008/0290914 A1     Nov. 27, 2008

(51) Int. Cl.
*G06F 1/00* (2006.01)
*G06F 1/12* (2006.01)
(52) U.S. Cl. .............. 713/500; 713/501; 712/1; 712/40
(58) Field of Classification Search .................. 713/500, 713/501; 712/1, 40
See application file for complete search history.

(56) References Cited

U.S. PATENT DOCUMENTS

2001/0042219 A1* 11/2001 Robertson ............. 713/400
2006/0164902 A1*  7/2006 Fung .................... 365/221
* cited by examiner

*Primary Examiner* — Thomas Lee
*Assistant Examiner* — Michael J Brown
(74) *Attorney, Agent, or Firm* — John J. Patti; Wade J. Brady, III; Frederick J. Telecky, Jr.

(57) ABSTRACT

A digital circuit may have at least two asynchronous clock domains with a controller responsive to a first domain clock signal and a target responsive to a second domain clock signal. A first domain control signal pulse is generated in response to the first domain clock signal for controlling the target. Each assertion the first domain control signal pulse is detected and used to form a second domain control signal pulse synchronized to the second domain clock signal. The target is controlled using the second domain control signal pulse. If the target is a clear-on-read register, contents of the clear-on-read register are latched in a feedback register in response to the first domain control signal pulse and provided to the controller. Each bit of the clear-on-read register is reset in response to the second domain control signal pulse only if the corresponding latched content of each bit in the feedback register is a logical one.

18 Claims, 6 Drawing Sheets

SELF-CLEARING ASYNCHRONOUS INTERRUPT EDGE DETECT LATCHING REGISTER

FIELD OF THE INVENTION

This invention generally relates to operation of signals across asynchronous clock domain boundaries in digital processing systems, and more particularly to detecting asynchronous interrupts.

BACKGROUND OF THE INVENTION

A digital system may have two or more clock domains in order to allow circuitry within each clock domain to be more easily optimized to perform the function of that domain. For example, a processor clock domain may operate at a high clock rate in order to perform a greater number of computations per given time period. A peripheral device clock domain may operate at a much lower clock rate in order to simplify design requirements and to reduce cost since peripheral devices generally can tolerate a slower control response time. However, in order for the processor domain to exert control over the peripheral device domain, control signals from the processor domain must be synchronized to the clock signal used in the peripheral device domain.

A commonly used solution for transferring interrupts from the peripheral device domain to the processor domain is to provide a register in the peripheral domain to receive interrupt signals and set a corresponding bit each time an interrupt is received. When the processor reads the interrupt register the processor then writes back the just read value through a synchronization process so that the corresponding bits are cleared from the interrupt register. This reduces the likelihood of loosing an interrupt indication when the interrupt occurs during the synchronization time of the processor read and write cycle. However, this scheme requires additional processor time and power to perform the write back operation.

SUMMARY OF THE INVENTION

An embodiment of the present invention includes two asynchronous clock domains with a controller responsive to a first domain clock signal and a target responsive to a second domain clock signal. A first domain control signal pulse is generated in response to the first domain clock signal for controlling the target. A second domain control signal pulse is formed synchronized to the second domain clock signal in response to each detected assertion of the first domain control signal pulse. The target in the second clock domain is controlled using the second domain control signal pulse.

In another embodiment, data obtained from the target is immediately fed back and combined with the second domain control signal pulse for controlling the target.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
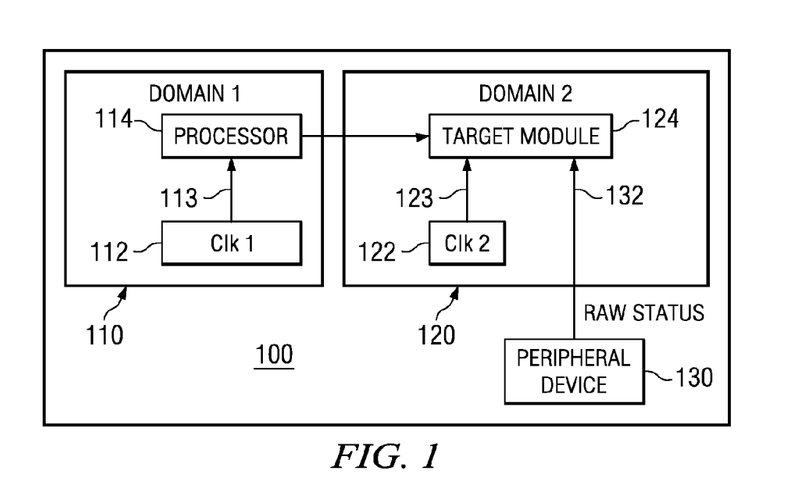
FIG. 1 is a block diagram of a digital system with two clock domains.

FIG. 1 is a block diagram of a digital system 100 with two clock domains 110 and 120. Processor domain 110 includes a clock generation circuit 112 that generates a periodic clock signal 113 that is used directly or indirectly after being buffered and/or divided and/or inverted to control synchronous circuitry within domain 110, such as processor 114. Peripheral device control domain 120 includes a clock generation circuit 122 that generates a periodic clock signal 123 that is used directly or indirectly after being buffered and/or divided and/or inverted to control synchronous circuitry within domain 120, such as target module 124. Clock generation circuit 122 operates asynchronously from clock generation circuit 112. In this embodiment, clock generator 122 is operated at a frequency that is equal to or greater than one-half the frequency of clock generator 112. For example, clock circuit 122 may be operated at 50 MHz in an embodiment, while clock circuit 112 is operated at 100 MHz. In another embodiment, clock circuit 122 is operated at 60 MHz while clock circuit 112 is operated at 50 MHz, for example. Other embodiments may use different clock rates as needed for performance or cost reasons.

Peripheral device(s) 130 represents various physical and/or virtual devices that gather or disperse data for digital system 100. Peripheral device(s) 130 may use clock signals derived from clock circuit 112 in one embodiment. In another embodiment, peripheral device(s) 130 may use clock signals derived from clock circuit 122. In yet another embodiment, peripheral device(s) 130 may use clock signals derived from a third clock generation circuit (not shown) that operates asynchronously to both clock 112 and clock 122. Peripheral device(s) 130 provide raw status information 132 that is captured by target module 124 for presentation to processor 114.

Digital system 100 may be a mobile, portable, desk top or stationary system. For example, an embodiment may be a cell phone in which domain 1 provides signal processing and call control and in which domain 2 controls the various peripheral devices included in the cell phone, such as the keypad, display, camera, etc. A radio transceiver and antenna, not shown, is connected to domain 1 for sending and receiving calls.

Figure 2:
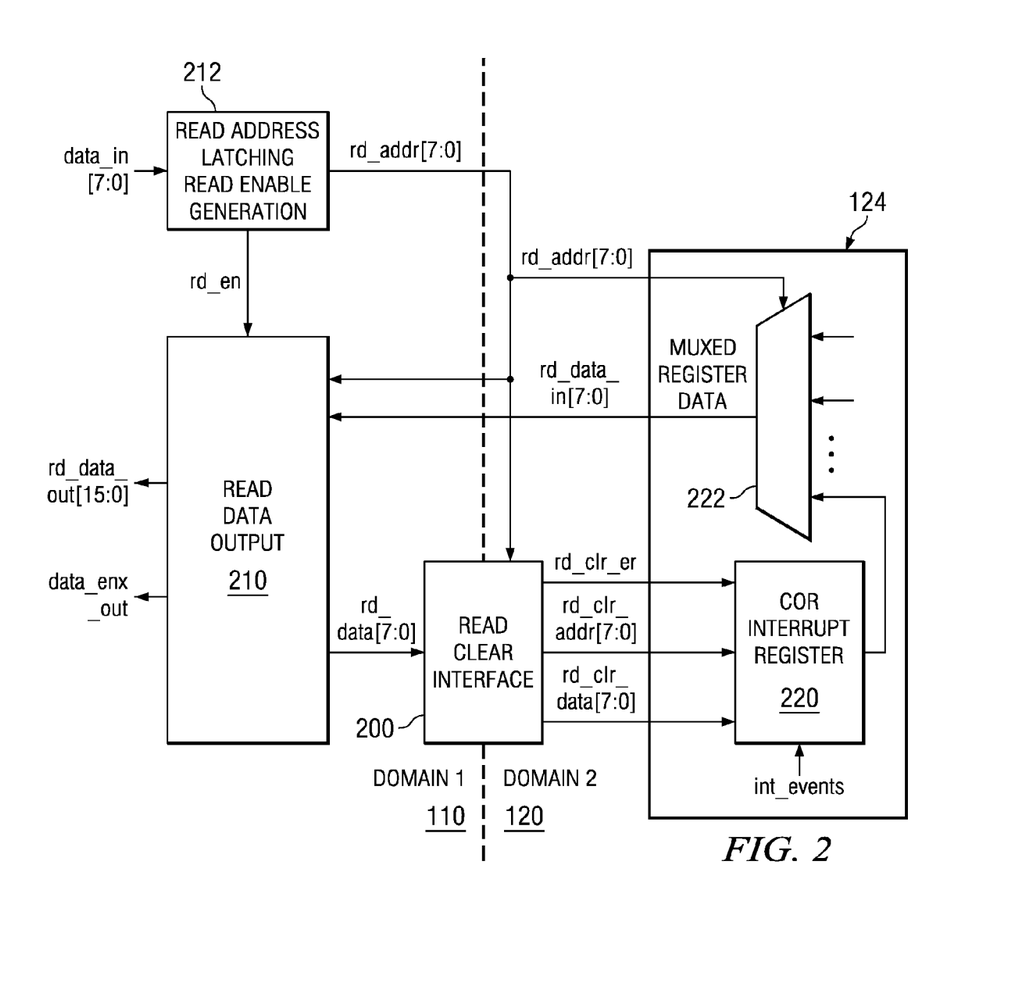
FIG. 2 is a more detailed block diagram of a control interface between the two clock domains of FIG. 1.

FIG. 2 is a more detailed block diagram of a control interface between the two clock domains 110 and 120 of FIG. 1. In this embodiment a fast interrupt status process for the host processor is provided that clears each bit of the interrupt register in domain two only if the bit was a logical one when read by the processor. Another embodiment may provide other control functions across clock domain boundaries using the concepts described herein. From a high level point of view, the idea consists of three major parts. Firstly, the host processor read instruction indicator, which in this embodiment is one host processor read clock cycle wide, is encoded into a toggle signal to indicate the read instruction using transitions so that each read instruction can be detected in the target asynchronous clock domain by detecting its edges. Secondly, both edges of the target domain clock are used to sample the toggle signal so that the asynchronous target domain clock does not need to be two times faster than the host processor read clock. Thirdly, the data read by the host processor is immediately fed back to the interrupt register and used in conjunction with a signal derived from sampling the toggle signal to clear each register bit only if the corresponding read data bit was a logical one, otherwise, the interrupt register bit is not cleared. This eliminates any blind spot, and also ensures transaction efficiency since only a single read operation is required to control the interrupt register. The interrupt register in this embodiment is referred to as a "clear on read" (COR) register. Note that the same idea can be applied to reset bits in which the active state is defined to be a logical zero.

Referring still to FIG. 2, read-clear interface 200 performs the first two parts discussed above, and will be described in more detail with reference to FIG. 3. COR interrupt register 220 receives interrupt event signals (int_event) from peripheral devices 130 or from other sources and is read and reset according to part three discussed above. Multiplexor 222 selects data from various registers within domain two in response to a read address (rd_addr [7:0]) and provides the selected read data (rd_data_in[7:0]) to read data output register 210 located in domain one. This register is latched in response to a read enable signal (rd_en) provided by read enable generation circuit 212. Data that is latched in read data output register 210 is provided to processor 114 via read data bus (rd_data_out[15:0]). Read data output register 210 also acts as a feedback register and immediately feeds the latched contents (rd_clr_data[7:0]) back to read-clear interface 200 for use in resetting COR register 220.

In this embodiment, read address register 212 latches an address of a register being requested by the processor using an indirect addressing scheme in which a processor write cycle is used to convey a command and an address parameter; in this case a data byte of "B0" provided on data bus (data_in[7:0]) indicates an address command which causes read address register 212 to latch the next write data on data bus (data[7:0]) and to use that data as an address for accessing resources in the target domain. A command of "B1" indicates a write command and write data is provided as a parameter. Similarly, a command of "B2" indicates a read command. Host processor 114 latches the data at the falling edge of a read clock signal (rdx_inv_in). For registers supporting DMA read, the host processor can repeat this step until all the data are read or send a new read command/address if it wants to read another register. However, the idea of the COR Interrupt Register is not limited by the addressing scheme.

Figure 3:
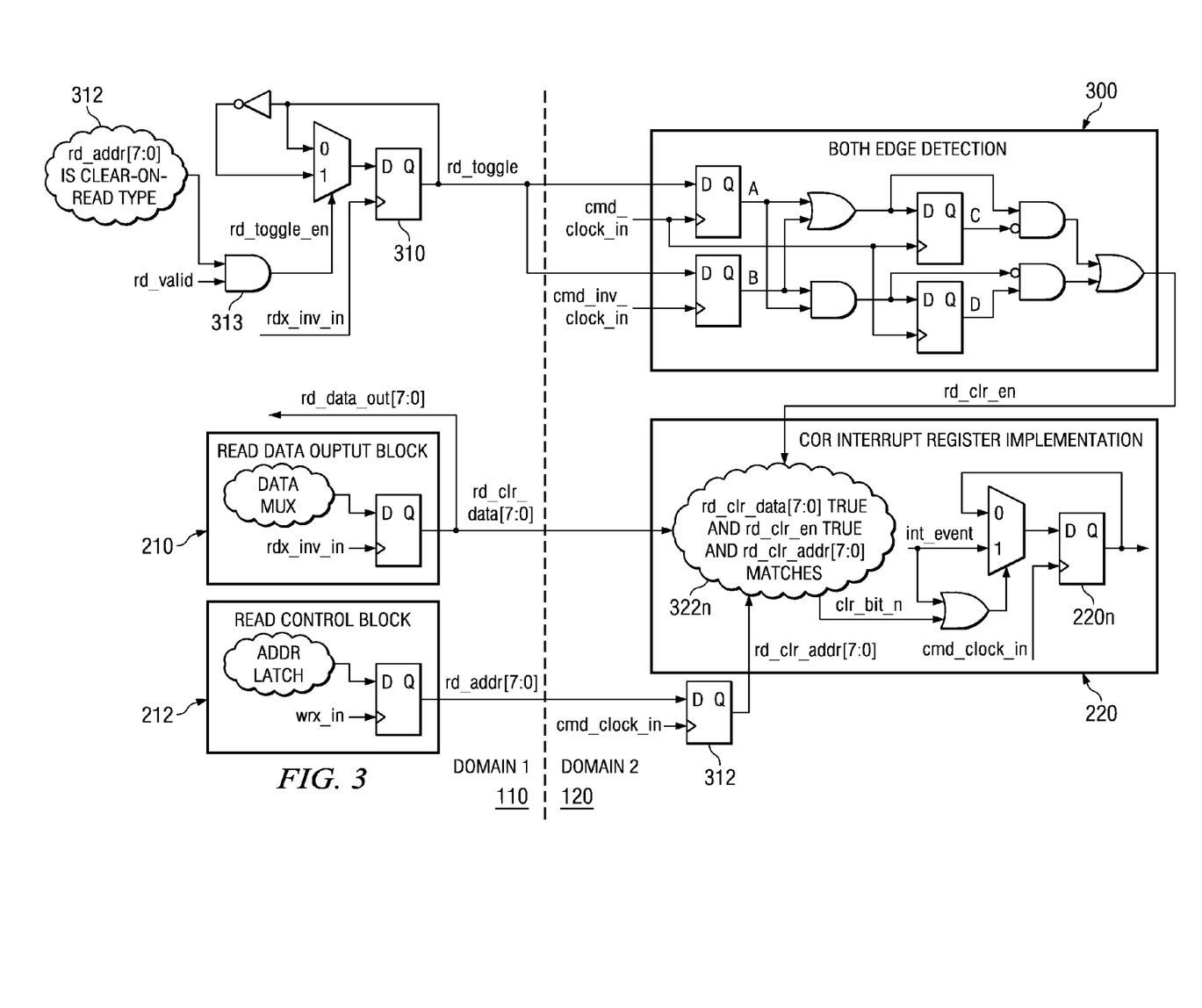
FIG. 3 is a more detailed schematic of the multi-domain control interface of FIG. 2.
Figure 4A:
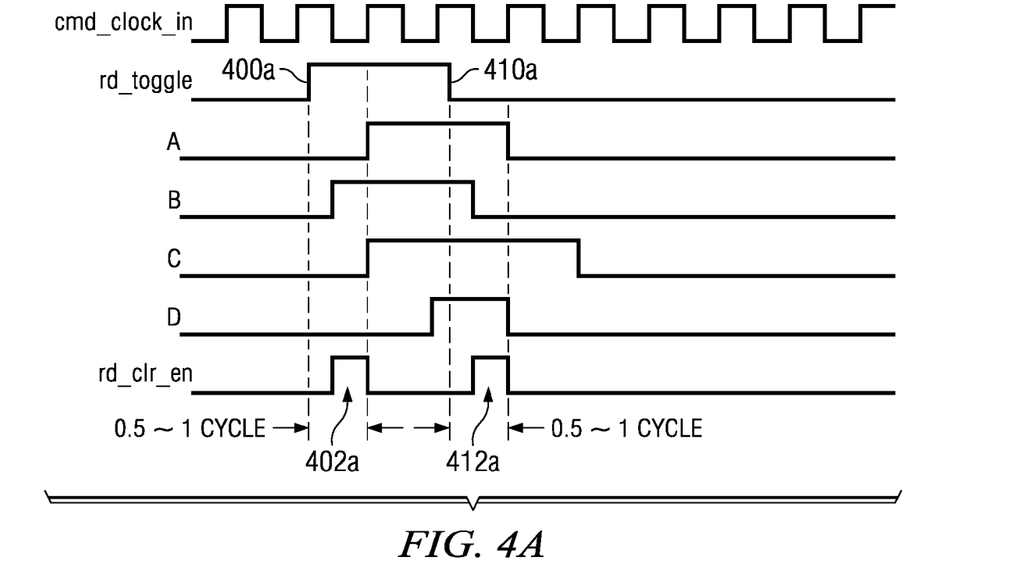
FIGS. 4A-D are timing diagrams illustrating operation of edge detection circuitry in the control interface.
Figure 4B:
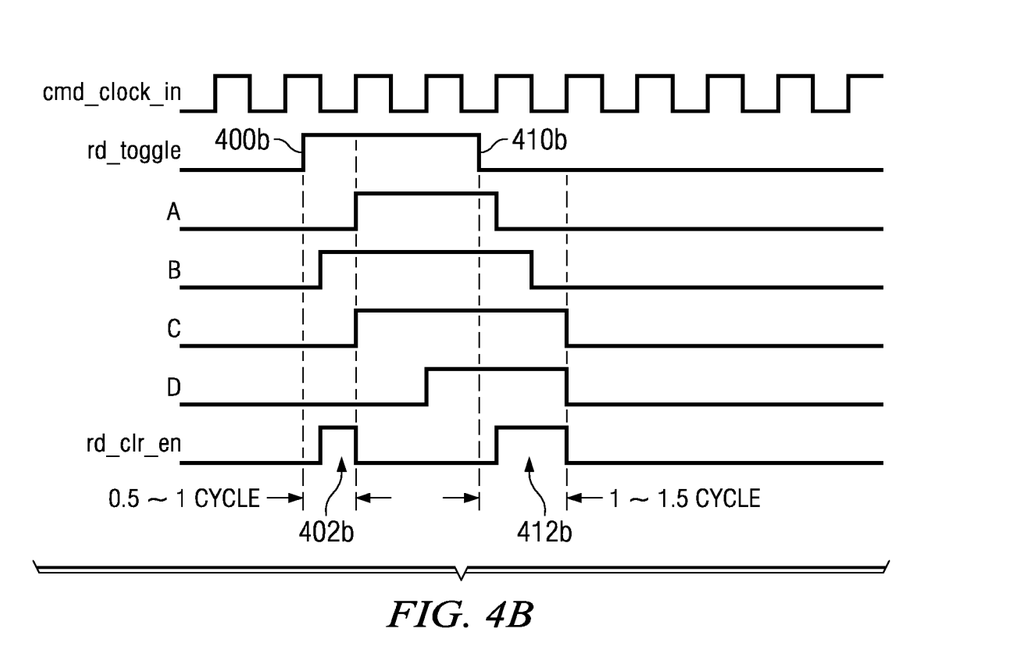
Figure 4C:
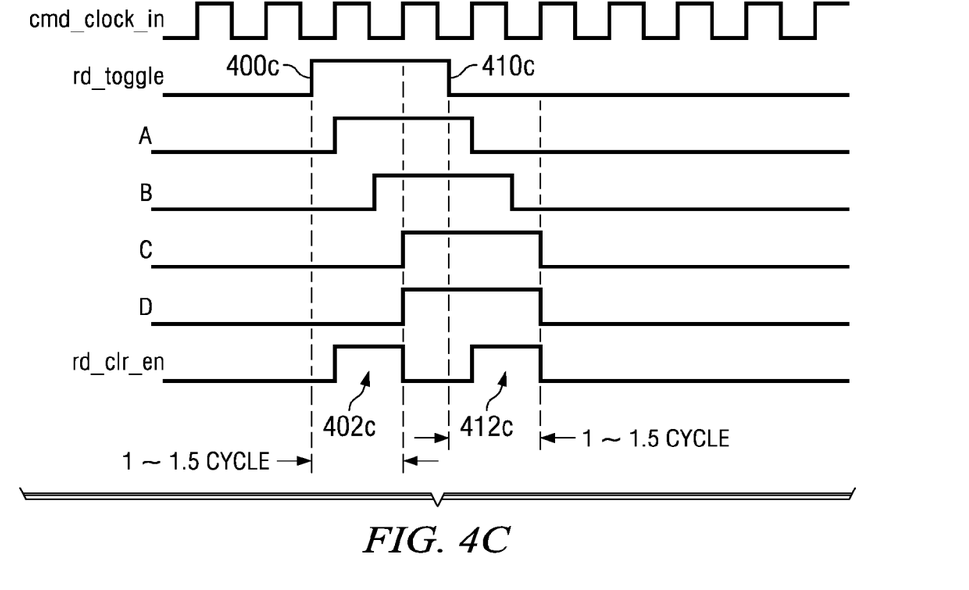
Figure 4D:
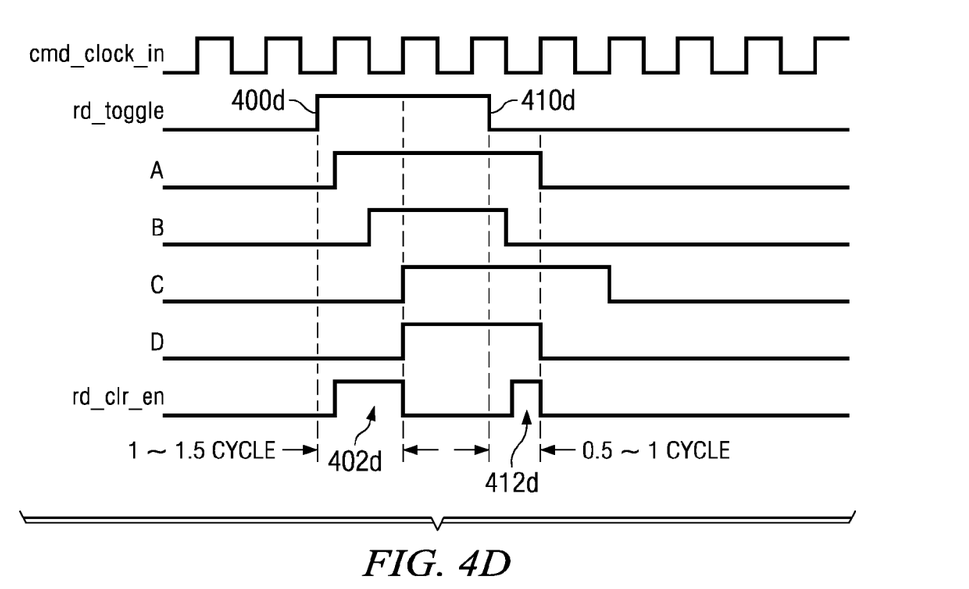

FIG. 3 is a more detailed schematic of the multi-domain control interface of FIG. 2. Read-clear register 220 clears itself after being read by the host processor when the address (rd_addr[7:0]) indicates COR register 220 is the target. The read data output block 210 latches the value provided by mux 222 as soon as it detects a "B2" command (read-latch) that asserts a read clock pulse (rdx_inv_in). The read control signal(rdx_inv_in) is also used indirectly to signal to COR register 220 that the read of this register has been completed (read-done). The latched register data (rd_data_out[7:0]) is sent to processor 114. COR register 220 has to properly clear its register bits upon seeing this read-done signal. Since this read-done signal is generated in processor clock domain 110, it must be synchronized into the target clock domain 120 before being used to clear the registers. However, a traditionally synchronized read-done signal would be delayed from the read-latch by two to three clock cycles in the target domain (cmd_clock_in in the present embodiment). If a raw event to the register occurs within this time window, the corresponding register bit should not be cleared, otherwise, this event will not be reported to the host processor and result in a blind spot.

Another problem to overcome in this interface embodiment is that the rdx_inv-in pulse in this embodiment can be as narrow as 8 ns which is narrower than the clock period of cmd_clock_in although there is at least 32 ns from one pulse to the next. Sampling this signal directly with a 16.63 ns command clock does not guarantee the capture of the pulse.

As shown in FIG. 3, a tattle-tail signal (rd_toggle) is formed by toggle circuit 310 that toggles at every rising edge of read clock pulse (rdx_inv_in) when there is a valid read to COR register 220 indicated by decode circuitry 312 and gate 313. "Both Edge Detection" circuit 300 detects both the rising edge and the falling edge of the tattle-tail (rd_toggle) signal. A target domain control pulse synchronous to the command clock domain is formed using the command clock (cmd_clock_in) and the inverted command clock (cmd_inv_clock_in) to form a read clear enable pulse (rd_clr_en). A copy of the latched register data (rd_clr_data[7:0]) is immediately fed back to decoding circuitry 322n after being latched in read data output block 210 during the read operation. An interrupt register bit 220n is cleared when and only when the rd_clr_en is TRUE, the rd_clr_addr[7:0] matches the register address, AND the corresponding bit in the rd_clr_data[7:0] is "1" as determined by decoding circuitry 322n. If true, a clear bit (clr_bit_n) signal is asserted and used to reset the corresponding register bit. Note that register bit 220n and decoding circuitry 322n represent one bit of a multiple-bit register 220. The read-clear data rd_clr_data[7:0] fed back from read data output block 210 is used to guarantee that if the interrupt event occurs after the register has been read, it will be latched for the next read. Therefore, only those register bits which are read as "1" in the current read cycle will be cleared and the next processor read will contain "0" in these bits if the corresponding interrupt event does not occur before the next processor read (false alarm free). Note that the interrupt registers are latched high (rising edge detected). If the event latch (int_event) happens at the same time as the clear pulse, the event latch overrides the clear pulse. If the event latch occurs after the clear pulse, since the read data of that register bit was 0, there will be no read-clear pulse generated for that register bit and the event will be latched into the register (blind spot free). This guarantees blind-spot free and false alarm free event latching.

FIGS. 4A-D are timing diagrams illustrating operation of edge detection circuitry 300 in the control interface. Based on the relationship between the rising/falling edges of the tattle-tail signal (rd_toggle) with respect to the rising/falling edges of the cmd_clock_in, there are a total 4 possibilities whereby the rd_clr_en pulse can be generated. All the 4 cases are illustrated in FIGS. 4A-D. The rd_clr_en pulse is active as early as a half clock cycle and as late as one and a half clock cycles from either edge of the rd_toggle signal. Note that the rd_clr_en pulse may be half clock cycle wide or one clock cycle wide. If the interrupt event occurs at the same time as the rd_clr_en is asserted, the interrupt event overrides the rd_clr_en, i.e. the event is latched into the register. Also, the register address will not change until another processor read instruction, which is one and half write cycles away from the completion of the current read cycle. By the time the register address changes, the rd_clr_en pulse is already deasserted. Each of FIGS. 4A-D represents two sequential read operations. If the read operations are not sequential, then the time between the rising edge and the falling edge of the read toggle signal will be longer. For each rising edge 400*a-d* of the tattle-tail signal (rd_toggle), detection circuit 300 produces a pulse 402*a-d* that is synchronized to the target domain command clock. Similarly, for each falling edge 410*a-d* of the tattle-tail signal (rd_toggle), detection circuit 300 produces a pulse 412*a-d* that is synchronized to the target domain 120 command clock.

In the present embodiment, the command clock cycle varies between 16.63 ns and 8 ns, and the rd_clr_en is sampled TRUE at least half command clock cycle and at most one and half command clock cycles away from the edges of the rd_toggle signal. This is due to the two level synchronization circuit in 300. If a one level synchronization circuit is used, this delay will be 0 to 0.5 command clock cycles. This leaves enough time for the interrupt register to change its value and propagate back to read data output block 210 for the next read.

Figure 5:
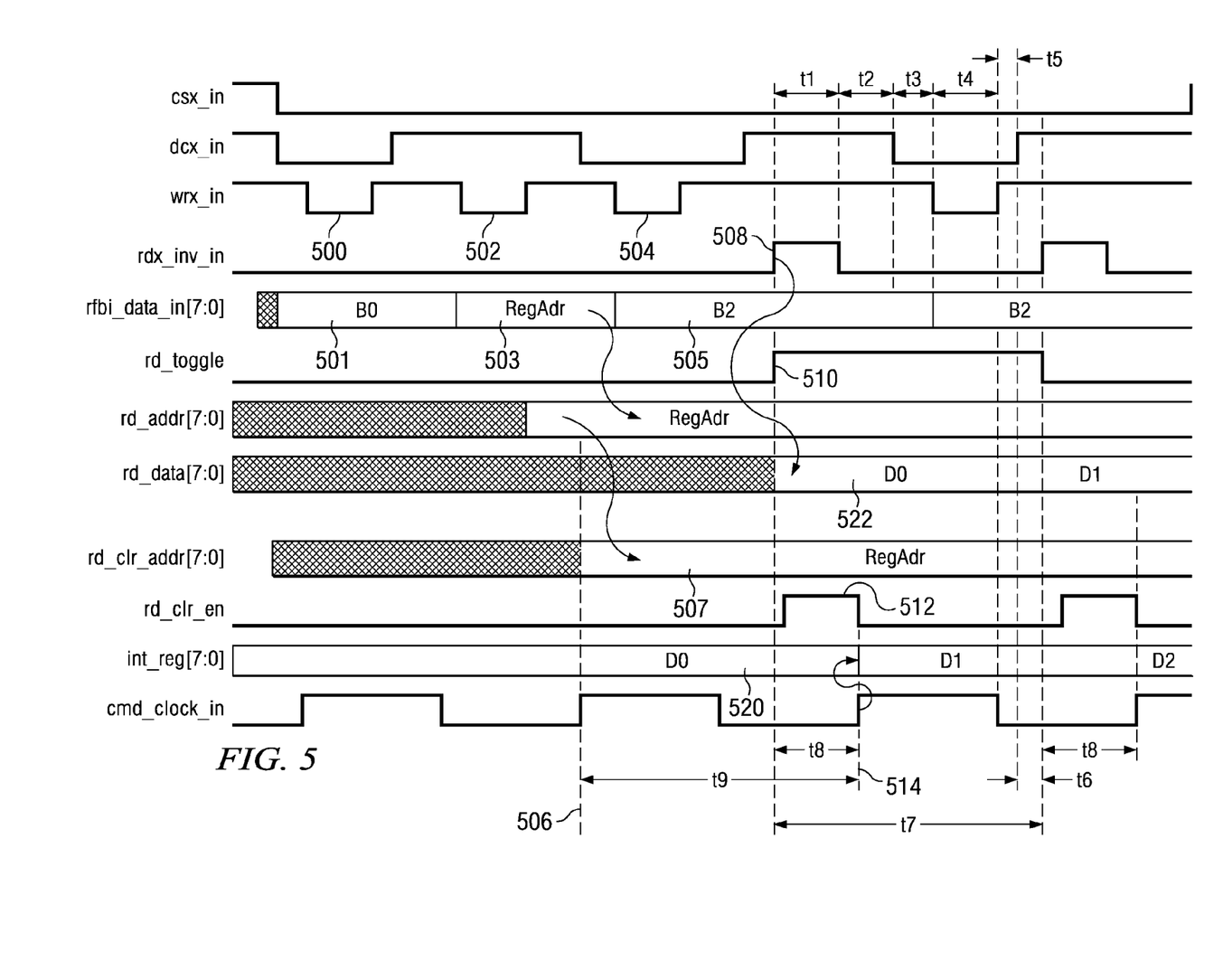
FIG. 5 is a timing diagram illustrating operation of the control interface.

FIG. 5 is an example timing diagram illustrating operation of the control interface with the timing parameters shown in Table 1, Timing Parameters for Read-Clear Circuit.

TABLE 1

Timing Parameters for Read-Clear Circuit

| No. | Name | Min | Max |
| --- | --- | --- | --- |
| 1 | t1 | 2Ta | 16T |
| 2 | t2 | T | — |
| 3 | t3 | T | — |
| 4 | t4 | 2T | 16T |
| 5 | t5 | T | — |
| 6 | t6 | T | — |
| 7 | t7 | 8T | — |
| 8 | t8 | | 8T |
| 9 | t9 | | 16/3 Tb | a. T is 4 ns in the present embodiment.
b. this is due to two level synchronization in 300. If one level synchronization is used this number will be 16T instead.

As mentioned earlier, the present embodiment uses an indirect addressing scheme to reduce cost. To perform a read operation, the following events happen: write pulse 500 with data parameter 501 equal to "B0" indicates an address cycle follows; write pulse 502 with parameter 503 indicates the desired register address and is latched by latch 212 to form rd_addr[7:0]; write pulse 504 with parameter 505 equal to "B2" indicates a read cycle command and causes the contents of the target register 520 to be latched 522 by read data output block 210; at time 506 the latched read address is latched 507 in the target domain address latch 312 by the command clock. Read pulse 508 in the processor domain then causes read toggle circuit 310 to toggle at 510 and also causes read data output latch 210 to capture the contents 520 of the target register as indicated at 522. Read toggle 510 is then detected in detector 300 to form a control pulse 512 in the target domain synchronized to the command clock. At time 514, each bit of the interrupt register is reset in response to rd_clr_en 512 being TRUE, the rd_clr_addr[7:0] 507 matches the register address, AND the corresponding bit in the rd_clr_data[7:0] 522 is "1" as determined by decoding circuitry 322*n*.

In other embodiments, a more straight-forward read cycle may be used in place of the indirect command sequence used in the present embodiment. In such an embodiment, a read cycle may be performed by a processor in one clock domain to a memory mapped location that targets a register in a different clock domain. A register access control pulse will be generated in the processor clock domain using memory mapped address decoding circuitry. Each assertion of the register access control signal pulse will be detected and will form a tattle-tail signal. A target domain control signal pulse synchronized to the target domain clock signal will be formed in response to each detected assertion of the processor domain control signal pulse. The target register is then controlled in the target clock domain using the target domain control signal pulse. If the target register is a clear-on-read type register, contents of the clear-on-read register are latched in a read data register in response to the register access control signal. Each bit of the clear-on-read register will be reset in response to the target domain control signal pulse only if the corresponding latched content of each bit in the read data register is a logical one.

Figure 6:
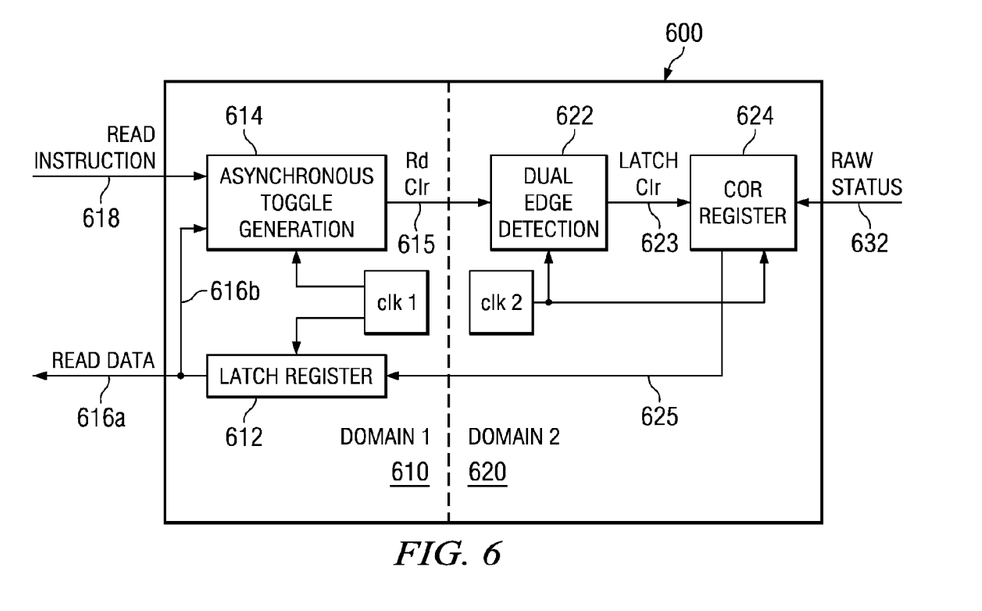
FIG. 6 is a block diagram of an alternative embodiment of a control interface between the two clock domains.

FIG. 6 is a block diagram of an alternative embodiment of a control interface 600 between two clock domains 610 and 620 in a system such as that illustrated in FIG. 1. Control domain 1 operates synchronously to clock generator clk1 while target domain 2 operates synchronously to target clock signal clk2. Clock signal clk2 is asynchronous to clock signal clk1. As before, one or more peripheral devices (not shown) provide raw status information 632 that is captured by target circuit 624 for presentation to a control circuit (not shown) such as processor 114 in FIG. 1. Feedback register 612 is connected to receive and latch the contents of target circuit 624 in synchronously with domain 1 clock signal clk1. Feedback register 612 is connected to provide the latched contents 616*a* to the control circuitry in response to a control signal 618 and also connected to provide the latched contents 616*b* back to the target. In this embodiment, latched contents 616*b* are connected to toggle circuit 614. Toggle circuit 614 is connected to receive a read control signal 618 from the control circuit and is operable to form a tattle-tail signal 615 such that the tattle-tail signal is toggled in response to each assertion of the read control signal only if latched contents 616*b* have a particular logical value. Edge detection circuitry 622 is connected to receive tattle-tail signal 615 and the target domain clock signal clk2 to form a synchronized target control signal 623 in such a manner that a pulse is formed synchronously to the target clock signal in response to each transition of the tattle-tail signal. Target control signal 623 is then used to control target register 624 synchronously to target clock clk2.

For example, target register 624 may be a clear on read (COR) register. COR register 624 may have eight bits, for example. Feedback register 612 will be connected to receive and latch the eight bits. Toggle circuitry 614 may have eight similar toggle circuits, each connected to receive respectively one bit from feedback register 612. Eight synchronized target control signals 623 are formed synchronously to the target clock as described above in such a manner that a pulse is formed only if the corresponding bit from feedback register 612 is a logical one. These eight control signals are then connected to reset a corresponding bit of COR register only if corresponding bit from feedback register 612 is a logical one when the COR register is being accessed by the control circuit.

In other embodiments, COR register 624 may have a larger or smaller number of bits. There may be fewer toggle circuits if only certain bits in the register 624 operate in a clear on read manner.

Figure 7:
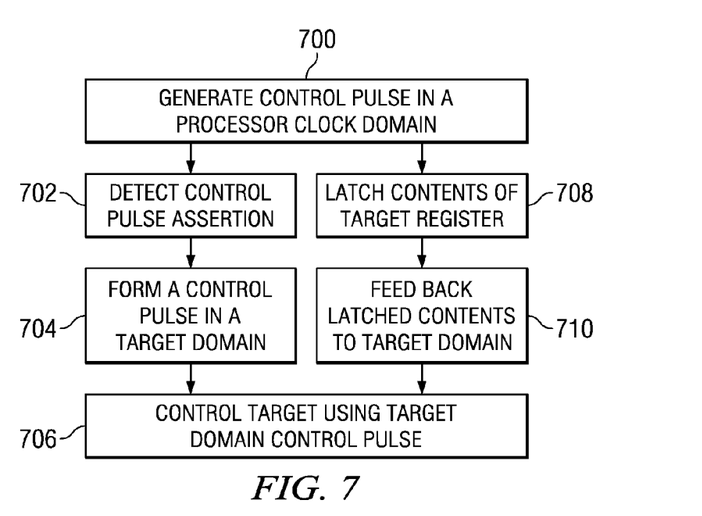
FIG. 7 is a flow diagram illustrating operation of the control interface.

FIG. 7 is a flow diagram illustrating operation of the control interface. This flow diagram illustrates a method for a processor in a processor clock domain to control a target register in a target domain in which the clock is asynchronous to the processor clock. The processor generates 700 a control pulse to indicate a control operation is to be performed. For example, the processor may generate a gated clock write signal pulse to indicate a target register is to be accessed. Each assertion of the write signal is detected 702 by toggling a tattle-tail signal to indicate the occurrence of the write signal pulse. A target domain write signal pulse is formed 704 that is synchronous to a target domain clock signal by detecting both edges of the target domain clock signal that transition immediately after the toggling of the tattle-tail signal. A target domain control signal is then formed in response to both edges of the target domain clock signal. The target register is controlled 706 using the target domain control signal so that no further control synchronization is required. For example, if the processor indicated a write operation, then the target domain write control signal pulse can be used to update the target register with write data from the processor, but in a manner that is synchronous with the target domain clock.

A read operation can be performed in a similar manner. If the target register is a clear-on-read register, then each individual bit of the register should be cleared when the processor performs a read cycle, but only if the data read by the processor is asserted. In order to perform in this manner, while the target register is in the target clock domain, its contents are latched 708 in a feedback register in the processor domain in response to a read signal pulse 700 from the processor. The latched contents of the feedback register are then presented to the processor as the contents of the target register to complete the processor read cycle. Meanwhile, the latched contents of the target register from the feedback register in the processor domain are immediately fed back 710 to the target domain to be used in conjunction with a target domain read signal control pulse that was formed 704 as discussed above in response to detecting 702 each occurrence of the processor read signal control pulse 700. In this manner, each bit in the clear-on-read target register is cleared if and only if the target domain read signal control pulse is asserted AND the clear-on-read register is being addressed AND the corresponding bit in the data from the feedback register is asserted.

In a similar manner, a set-on-read register could be embodied by setting each bit in the set-on-read target register if and only if the target domain read signal control pulse is asserted AND the set-on-read register is being addressed AND the corresponding bit in the data from the feedback register is negated.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, bus widths and/or operating frequencies may be different from those discussed herein. In another embodiment, there may be three or more clock domains with control signals being transferred across two or more control interfaces. In another embodiment, the synchronized control pulse(s) may be used to control targets other than just registers, such as blocks of memory, physical or virtual control bits for physical or virtual peripheral devices, etc. In another embodiment, there may be additional tattle-tail circuits and edged detection circuits for providing synchronized control signals to control additional target circuits. In another embodiment, the clock generator circuits may be located remotely from the clock domain circuits. In another embodiment, the controller in domain 110 may be different than a processor, such as a state machine, proportional-integral-derivative controller (PID controller), etc.

It is therefore contemplated that the appended claims will cover any such modifications of the embodiments as fall within the true scope and spirit of the invention.

What is claimed is:

1. A method of operating a digital circuit having at least two asynchronous clock domains with a controller responsive to a first domain clock signal and a target responsive to a second domain clock signal, comprising:
   generating a first domain control signal pulse in response to the first domain clock signal for controlling the target;
   detecting each time the first domain control signal pulse is asserted;
   forming a second domain control signal pulse synchronized to the second domain clock signal in response to each detected assertion of the first domain control signal pulse;
   controlling the target using the second domain control signal pulse; and
   latching contents of the target in a feedback register in response to the first domain clock signal so as to provide the latched contents to the controller and the target.

2. The method of claim 1, wherein the first domain control signal pulse is for a read operation for the first domain, and wherein the target is a clear-on-read register, and wherein the step of controlling the target further comprises resetting each bit of the clear-on-read register in response to the second domain control signal pulse only if the corresponding latched content of each bit in the feedback register is a logical one.

3. The method of claim 2, wherein the method further comprises presenting the latched contents of the feedback register to satisfy the read operation.

4. The method of claim 1, wherein the first domain control signal pulse is for a read operation for the first domain, and the target is a set-on-read register, and wherein the step of controlling the target further comprises setting each bit of the set-on-read register in response to the second domain control signal pulse only if the corresponding latched content of each bit in the feedback register is a logical zero.

5. The method of claim 1, wherein the first domain control signal pulse has a width less than a period of the second domain clock signal.

6. The method of claim 1, wherein the first domain control signal pulse is for a write operation for the first domain, and the target is a memory device, and wherein the method further comprises storing data provided by the controller in the memory device in response to the second domain control signal pulse.

7. The method of claim 1, wherein the step of detecting each time the first domain control signal pulse is asserted causes a tattle-tail signal to toggle that is used to form the second domain control signal pulse.

8. A digital system having at least a first clock domain and second clock domain, the system comprising:

a first clock generator for generating a first clock signal;

a second clock generator for generating a second clock signal, wherein the second clock signal is generated asynchronously with the first clock signal;

target circuitry in the second clock domain connected to operate synchronously to the second clock signal;

control circuitry in the first clock domain responsive to the first clock signal for generating a target control signal for controlling the target circuitry;

toggle circuitry connected to receive the target control signal being operable to form a tattle-tail signal such that the tattle-tail signal is toggled in response to each assertion of the target control signal;

edge detection circuitry connected to receive the tattle-tail signal and the second clock signal to form a synchronized target control signal such that a pulse is formed synchronously to the second clock signal in response to each transition of the tattle-tail signal, the synchronized target control signal connected to control the target circuitry; and a feedback register connected to receive and latch the contents of the target circuitry in response the first clock signal, the feedback register connected to provide the latched contents to the control circuitry and also connected to provide the contents back to the target.

9. The digital system of claim 8, wherein the target is a clear-on-read register, further comprising clear-on-read control logic to connected to receive for each bit of the clear-on-read register a corresponding bit of the feedback register and connected to receive the synchronized target control signal and operable to form a reset signal for each bit of the clear-on-read register that has a first logic value only if the corresponding bit of the feedback latch has the first logic value.

10. The digital system of claim 9, wherein the first logic value is a logical one.

11. The digital system of claim 9 being a cellular phone further comprising a peripheral device, wherein the clear-on-read register is connected to receive interrupts from the peripheral device and to thereby set a bit in the COR register to the first logic value.

12. A digital system comprising:

a first clock generator in a processor clock domain for generating a processor clock signal;

a second clock generator in a target clock domain for generating a target clock signal, wherein the target clock signal is generated asynchronously with the processor clock signal;

a clear-on-read (COR) register connected to operate synchronously to the target clock signal;

a processor responsive to the processor clock signal for generating a read control signal for reading the COR register;

tattle-tail circuitry connected to receive the read control signal being operable to form a tattle-tail signal such that the tattle-tail signal is toggled in response to each assertion of the read control signal;

edge detection circuitry connected to receive the tattle-tail signal and the target clock signal to form a synchronized target control signal such that a pulse is formed synchronously to the target clock signal in response to each transition of the tattle-tail signal;

a feedback register connected to receive and latch the contents of the COR register responsive to the processor clock signal and connected to provide the latched contents to the processor to satisfy a read request; and clear-on-read logic connected to receive for each bit of the COR register a corresponding bit of the feedback register and connected to receive the synchronized target control signal and operable to form a reset signal for each bit of the COR register that has a first logic value only if the corresponding bit of the feedback latch has the first logic value when the target control signal is asserted and when the COR register is being accessed by the processor.

13. The digital system of claim 12, wherein the first logic value is a logical one.

14. The digital system of claim 12 being a cellular phone further comprising a peripheral device, wherein the clear-on-read register is connected to receive interrupts from the peripheral device and to thereby set a bit in the COR register to the first logic value.

15. A digital system having at least a first clock domain and a second clock domain, comprising:

a clock generator for generating a first clock signal for use in the first clock domain and a clock generator for generating a second clock signal for use the second clock domain, wherein the second clock is generated asynchronously with the first clock signal;

means for generating a first domain control signal pulse in response to the first clock signal for controlling the target;

means for detecting each time the first domain control signal pulse is asserted;

means for forming a second domain control signal pulse synchronized to the second clock signal in response to each detected assertion of the first domain control signal pulse;

means for controlling the target in the second clock domain using the second domain control signal pulse; and means for latching feedback contents of the target in response to the first clock signal so as to provide the latched contents to the means for controlling and the target.

16. The system of claim 15, wherein the first domain control signal pulse is for a read operation for the first domain, and the target is a clear-on-read register, wherein the means for controlling the target further comprise means for resetting each bit of the clear-on-read register in response to the second domain control signal pulse only if the corresponding latched feedback content of each bit is a logical one.

17. The system of claim 16, wherein the system further comprises means for presenting the latched contents of the feedback register to satisfy the read operation.

18. The system of claim 15, wherein the first domain control signal pulse is for a read operation for the first domain, and the target is a set-on-read register, and wherein the means for controlling the target further comprise means for setting each bit of the set-on-read register in response to the second domain control signal pulse only if the corresponding latched feedback content of each bit is a logical zero.

* * * * *